US011024022B2

(12) United States Patent
Umeda et al.

(10) Patent No.: US 11,024,022 B2
(45) Date of Patent: Jun. 1, 2021

(54) DATA GENERATION METHOD AND DATA GENERATION DEVICE

(71) Applicant: FUJITSU LIMITED, Kawasaki (JP)

(72) Inventors: Yuhei Umeda, Kawasaki (JP); Tsutomu Ishida, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 173 days.

(21) Appl. No.: 16/376,107

(22) Filed: Apr. 5, 2019

(65) Prior Publication Data

US 2019/0228516 A1 Jul. 25, 2019

Related U.S. Application Data

(63) Continuation of application No. PCT/JP2018/004180, filed on Feb. 7, 2018.

(30) Foreign Application Priority Data

Mar. 3, 2017 (JP) ............................ JP2017-040326

(51) Int. Cl.
*G06T 7/00* (2017.01)
*G06N 20/00* (2019.01)
*G01N 21/00* (2006.01)

(52) U.S. Cl.
CPC ............ *G06T 7/001* (2013.01); *G01N 21/00* (2013.01); *G06N 20/00* (2019.01); *G06T 2207/30148* (2013.01)

(58) Field of Classification Search
None
See application file for complete search history.

(56) References Cited

U.S. PATENT DOCUMENTS 5,168,262 A 12/1992 Okayama
7,720,275 B2 * 5/2010 Shibuya .............. G06K 9/6221 382/149

(Continued)

FOREIGN PATENT DOCUMENTS

JP 02-151997 6/1990
JP 2002-032103 1/2002

(Continued)

OTHER PUBLICATIONS

Ming-Ju Wu et al., "Wafer Map Failure Pattern Recognition and Similarity Ranking for Large-Scale Data Sets", IEEE Transactions on Semiconductor Manufacturing, vol. 28, No. 1, pp. 1-12, Feb. 2015 (12 pages).
Intenational Search Report attached with the Written Opinion of the International Searching Authority, mailed in connection with PCT/JP2018/004180 and dated Apr. 3, 2018, with partial English translation (10 pages).

(Continued)

*Primary Examiner* — David Perlman
(74) *Attorney, Agent, or Firm* — Fujitsu Patent Center

(57) ABSTRACT

A non-transitory computer-readable recording medium storing a program that causes a computer to execute a procedure, the procedure includes generating, for each of a plurality of wafers, extended coordinates including a position on the wafer and a value calculated from a distance from a center of the wafer and a contribution parameter, for each defect on the wafer by using information of a defect position on the wafer, generating a Betti number group by persistent homology processing for a plurality of extended coordinates generated for each of the plurality of wafers generating, for each of the plurality of wafers, a defect pattern image from a plurality of Betti number groups generated for the plurality of values of contribution parameter, and generating machine learning data associating a plurality of defect pattern images generated for the plurality of wafers with determination information associated with the plurality of wafers.

7 Claims, 30 Drawing Sheets

: DEFECT CHIP

(56) References Cited

U.S. PATENT DOCUMENTS

| | | | | |
|---|---|---|---|---|
| 7,987,150 | B1 * | 7/2011 | Luu | G06N 5/025 706/47 |
| 9,430,688 | B1 | 8/2016 | Ray | |
| 2005/0021303 | A1 * | 1/2005 | Matsushita | G11C 29/006 702/185 |
| 2007/0192066 | A1 | 8/2007 | Ide | |
| 2008/0058977 | A1 * | 3/2008 | Honda | G06T 7/74 700/110 |
| 2011/0264404 | A1 * | 10/2011 | Yanai | G03F 7/7065 702/150 |
| 2013/0045545 | A1 * | 2/2013 | Lee | H01L 22/20 438/5 |
| 2017/0147946 | A1 | 5/2017 | Umeda | |
| 2019/0385020 | A1 | 12/2019 | Umeda | |

FOREIGN PATENT DOCUMENTS

| | | |
|---|---|---|
| JP | 2004-310500 | 11/2004 |
| JP | 2007-108998 | 4/2007 |
| JP | 2017-097643 | 6/2017 |
| JP | 2018-092349 | 6/2018 |
| WO | 2016/090044 | 6/2016 |

OTHER PUBLICATIONS

Fatima Adly et al., "Machine-Learning-Based Identification of Defect Patterns in Semiconductor Wafer Maps: An Overview and Proposal", Parallel & Distributed Processing Symposium Workshop (IPDPSW), 2014 IEEE International, [Online], IEEE, Dec. 4, 2014 (date of receipt), pp. 420-428, [search date Mar. 27, 2018] Internet: <URL:http://ieeexplore.ieee.org/document/6969418/> (11 pages). Cited in ISR.

Yuhei Umeda, "What the Shape of Data Tells—Topological Data Analysis and Its Appliation-", Information Processing Society of Japan, vol. 57, No. 11, pp. 1122-1127, Oct. 2016 (11 pages), with partial English Translation. Cited in ISR.

"Time-series Deep Learning: New AI Technology that Supports Safe Human Lives", Fujitsu Ltd., Mar. 10, 2016, [online], [retrieved on Dec. 1, 2016], Internet: <URL: http://journal.jp.fujitsu.com/2016/03/10/01/> English Translation (10 pages).

International Search Report, mailed in connection with PCT/JP2018/007041 and dated May 22, 2018 (1 page).

Non-Final Rejection dated Jan. 27, 2021 for related U.S. Appl. No. 16/554,886 [pending].

* cited by examiner

: NORMAL CHIP

: DEFECT CHIP

: NORMAL CHIP

: DEFECT CHIP

: NORMAL CHIP

: DEFECT CHIP

FIG. 13

| $\alpha$ |
| --- |
| 0.0 |
| 0.1 |
| 0.2 |
| 0.3 |
| 0.4 |
| ⋮ |
| 1.0 |

FIG. 17

| DIMENSION | OCCURRENCE RADIUS | ANNIHILATION RADIUS |
|---|---|---|
| 1 | 0.10 | 0.12 |
| 1 | 0.11 | 0.14 |
| 1 | 0.12 | 0.13 |
| 1 | 0.12 | 0.15 |
| ⋮ | ⋮ | ⋮ |

ZERO-DIMENSIONAL HOLE
ONE-DIMENSIONAL HOLE
TWO-DIMENSIONAL HOLE
0 0.005 0.01 0.015 0.02 0.025
BETTI NUMBERS
20 18 16 14 12 10 8 6 4 2 0
0 50 100 150 200 250 300
TIME 2.5
2
1.5
1.0
0.5
0
1
2
4
6
8
10
1
2
4
6
8
10
AVERAGE
VARIANCE
SOLID LINE: WAFER w1, DOTTED LINE: WAFER w2, DASHED LINE: WAFER w3

DATA GENERATION METHOD AND DATA GENERATION DEVICE

CROSS-REFERENCE TO RELATED APPLICATION

This application is a continuation application of International Application PCT/JP2018/004180 filed on Feb. 7, 2018 and designated the U.S., the entire contents of which are incorporated herein by reference. The International Application PCT/JP2018/004180 is based upon and claims the benefit of priority of the prior Japanese Patent Application No. 2017-040326, filed on Mar. 3, 2017, the entire contents of which are incorporated herein by reference.

FIELD

The embodiment discussed herein is related to a data generation and a data generation for relating to a technology of processing information of defects in a wafer.

BACKGROUND

When distributions of defects generated on wafers are similar in shape between the wafers, the same process in processing of those wafers may be the cause of such defects. Therefore, a problematic process is identified based on information of positions of IC chips with defects (hereinafter referred to as the defect chips) on the wafer.

There is, for example, a document disclosing a technology of extracting a characteristic amount from data generated by performing Radon transform on map data of defect chips, and then identifying the cause of defects based on the extracted characteristic amount.

Related technologies is disclosed in, for example, Ming-Ju Wu, Jyh-Shing R. Jang, and Jui-Long Chen, "Wafer Map Failure Pattern Recognition and Similarity Ranking for Large-Scale Data Sets", IEEE Transactions on Semiconductor Manufacturing, February, Heisei 27 (2015), Vol. 28, No. 1, pp. 1-12

SUMMARY

According to an aspect of the invention, a non-transitory computer-readable recording medium storing a program that causes a computer to execute a procedure, the procedure includes generating, for each of a plurality of wafers, extended coordinates including a position on the wafer and a value calculated from a distance from a center of the wafer and a contribution parameter, for each defect on the wafer by using information of a defect position on the wafer, generating a Betti number group by persistent homology processing for a plurality of extended coordinates generated for each of the plurality of wafers generating, for each of the plurality of wafers, a defect pattern image from a plurality of Betti number groups generated for the plurality of values of contribution parameter, and generating machine learning data associating a plurality of defect pattern images generated for the plurality of wafers with determination information associated with the plurality of wafers.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 13 is a diagram illustrating an example of a value of $\alpha$;

FIG. 17 is a diagram illustrating an example of bar code data;

DESCRIPTION OF EMBODIMENTS

Figure 1A:
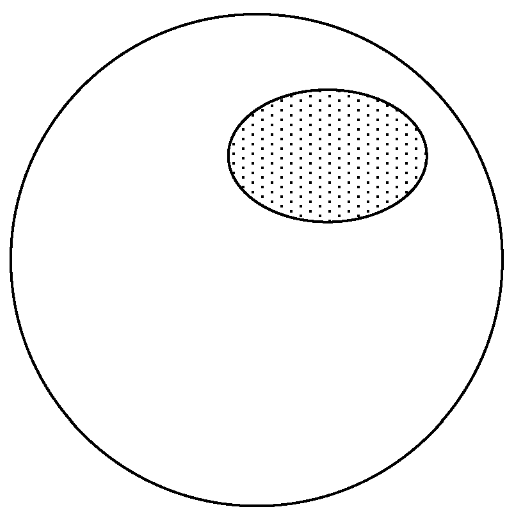
FIGS. 1A and B are diagrams illustrating an example of a distribution of defect chips.
Figure 1B:
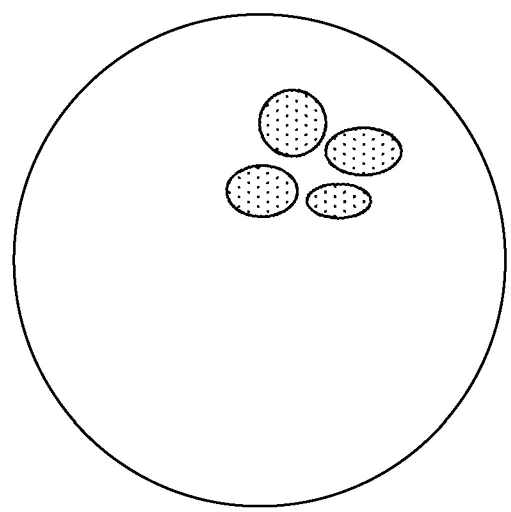

However, there is a case where it is not favorable to use the technology disclosed in the above document. For example, comparing a wafer illustrated in FIG. 1A and a wafer illustrated in FIG. 1B, positions of defect chips distributed on the wafers are approximately the same but distribution shapes are different. In such a case, the cause of the defect chips illustrated in FIG. 1A may be different from the cause of the defect chips illustrated in FIG. 1B. However, the use of the technology of the above document may result in determination that the defect chips are generated by the same cause.

Figure 2:
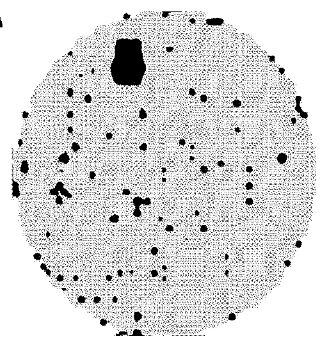
FIGS. 2A-C are diagrams illustrating an example of a distribution pattern of defect chips.
Figure 2:
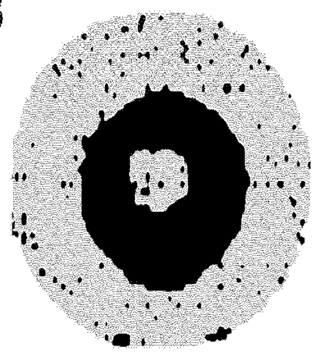
Figure 2:
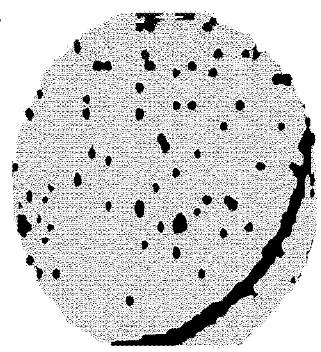

FIG. 2 is a diagram illustrating an example of a distribution pattern of defect chips.

A distribution pattern of FIG. 2A is called "cluster", in which defect chips are present in clusters. To determine whether or not the distribution pattern is the cluster, the position from the center of a wafer, the size of the distribution, the density of the distribution, and BIN are taken into consideration. Meanwhile, the rotation of the wafer is basically not taken into consideration (that is, when a certain distribution pattern is turned into the same distribution pattern as another distribution pattern by the rotation of the wafer, the both are considered as the same distribution pattern).

A distribution pattern of FIG. 2B is called "ring", in which defect chips distributed in a ring shape are present in the center of a wafer. To determine whether or not the distribution pattern is the ring, the position from the center of the wafer, the shape of the distribution (for example, circle or semicircle), the size of the distribution, the density of the distribution, and BIN are taken into consideration. Meanwhile, the rotation of the wafer is not taken into consideration.

A distribution pattern of FIG. 2C is called "scratch", in which defect chips are distributed in a linear shape. To determine whether or not the distribution pattern is the scratch, the shape of the distribution (for example, linear or circular), the number of lines, and the like are taken into consideration. Meanwhile, the position from the center of the wafer, the rotation of the wafer, and BIN are not taken into consideration.

By previously identifying a distribution pattern for each cause of defect chips, visual check of a distribution of defect chips on a newly manufactured wafer may allow the cause of the defect chips to be identified. However, there are various causes of the defect chips, and thus numerous variations of distributions, making classification difficult.

Therefore, discussion is given below of classification performed based on characteristic information extracted from positional information of defect chips, rather than the positional information itself of the defect chips.

Figure 3:
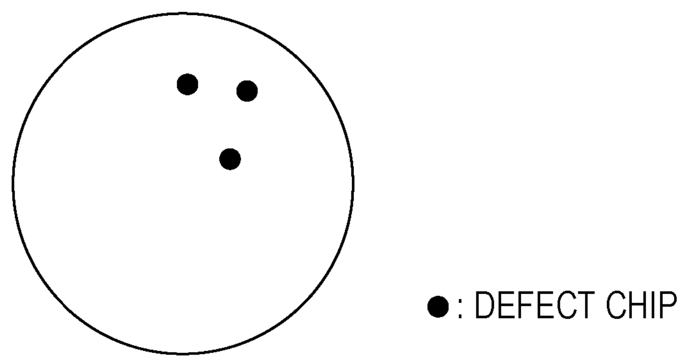
FIG. 3 is a diagram illustrating an example of a distribution of defect chips.
Figure 4:
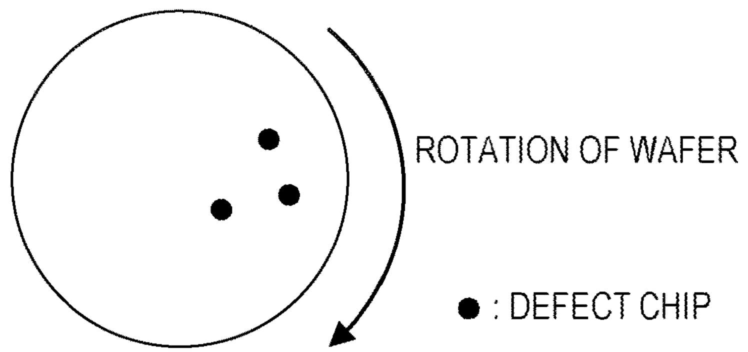
FIGS. 4A-C are diagrams illustrating an example of a distribution of defect chips.
Figure 4:
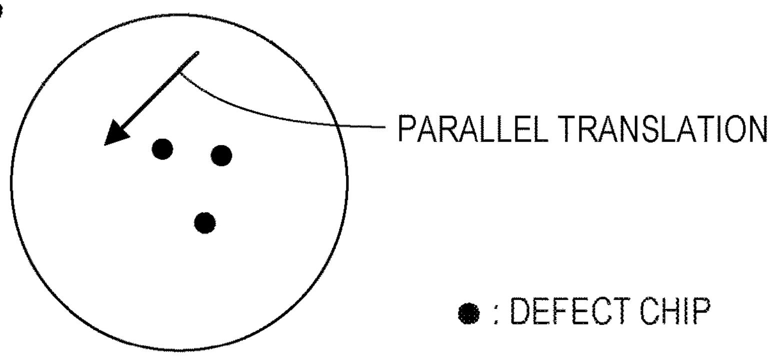
Figure 4:
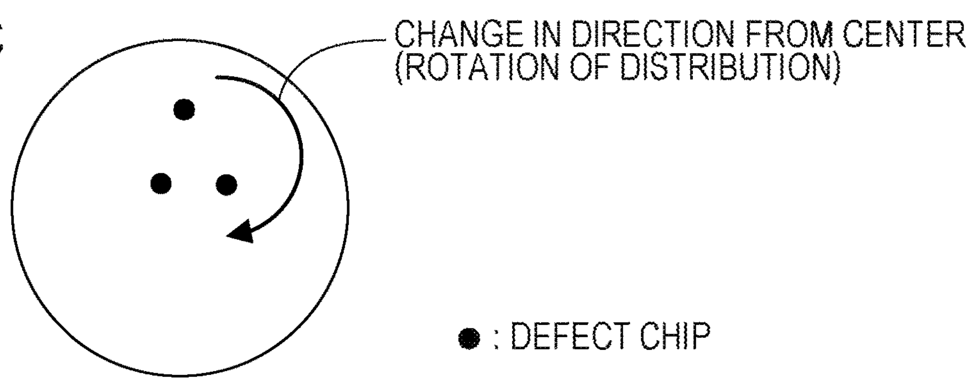
Figure 5:
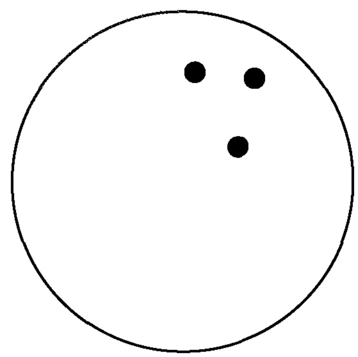
FIGS. 5A-C are diagrams illustrating an example of a distribution of defect chips.
Figure 5:
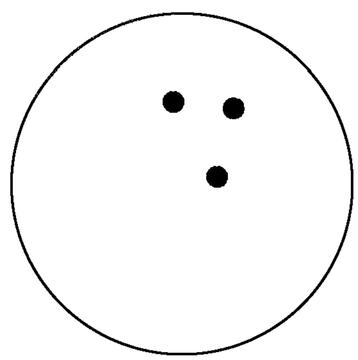
Figure 5:
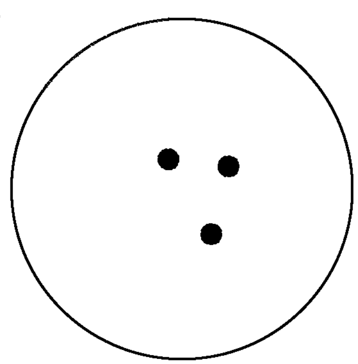

With reference to FIGS. 3 to 5, requirements of the characteristic information are discussed. The relationship between a distribution illustrated in FIG. 3 and a distribution illustrated in FIG. 4A corresponds to the rotation of a wafer. The both distributions have the same distance from a center of the wafer, and thus are preferably considered as the same distribution. On the other hand, the relationship between the distribution illustrated in FIG. 3 and a distribution illustrated in FIG. 4B corresponds to parallel translation of the defect chips. The both distributions have different distances from the center of the wafer, and thus may be preferably considered to be different from each other. The relationship between the distribution illustrated in FIG. 3 and a distribution illustrated in FIG. 4C corresponds to the rotation of the distribution itself. The both distributions have different directions from the center of the wafer, and thus may be preferably considered to be different from each other.

It is preferable that the "proximity" (that is, distance) between distribution patterns may be determined. FIG. 5 is a diagram illustrating an example of a distribution of defect chips. The relationship among three distributions illustrated in FIGS. 5A to 5C corresponds to parallel translation. A parallel translation distance between the distributions illustrated in FIGS. 5A and 5B is shorter than a parallel translation distance between the distributions illustrated in FIGS. 5A and 5C. In such a case, the distributions of FIGS. 5A and 5B may be preferably considered as the same distribution, while the distributions of FIGS. 5A and 5C may be preferably considered to be different from each other.

In light of the above, the following is preferably reflected on the characteristic information.

(1) Positional relationship between defect chips (that is, shape of distribution)

(2) Distance from the center of the wafer (3) Direction from the center of the wafer (4) "Proximity" among the information (1) to (3)

Now, discussion is given of extraction of characteristic information using persistent homology that is a technique capable of breaking location information of points down into patterns. With the execution of persistent homology processing, the distance from the center of the water and the direction from the center thereof are not reflected on the characteristic information even though the rotation of the wafer may be ignored.

Therefore, consideration is given to transforming two-dimensional coordinates (x, y) representing the position of a defect chip on a wafer to three-dimensional coordinates (x, y, z) by adding a value of a height axis (here, z-axis) corresponding to the distance from the center to the two-dimensional coordinates (x, y). For example, z is set as $z=x^2+y^2$.

Figure 6:
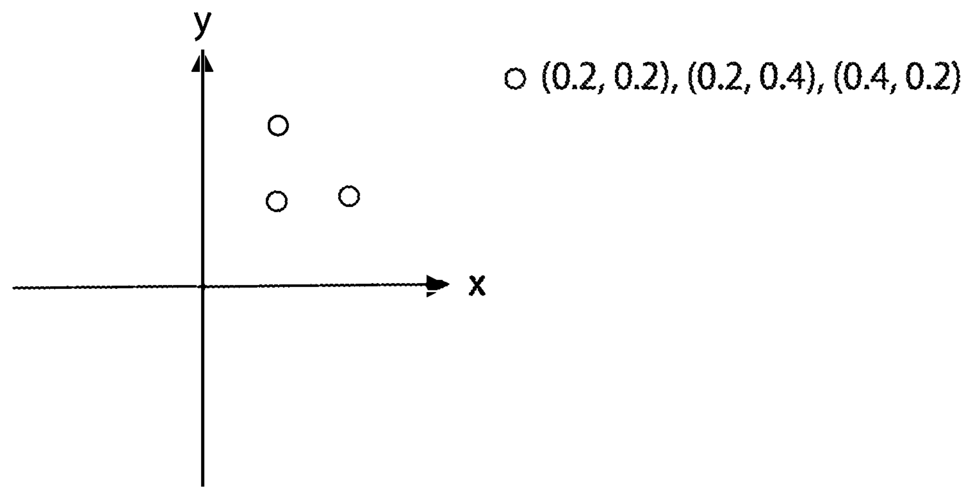
FIGS. 6A and B are diagrams illustrating positions of defect chips on a two-dimensional space.
Figure 6:
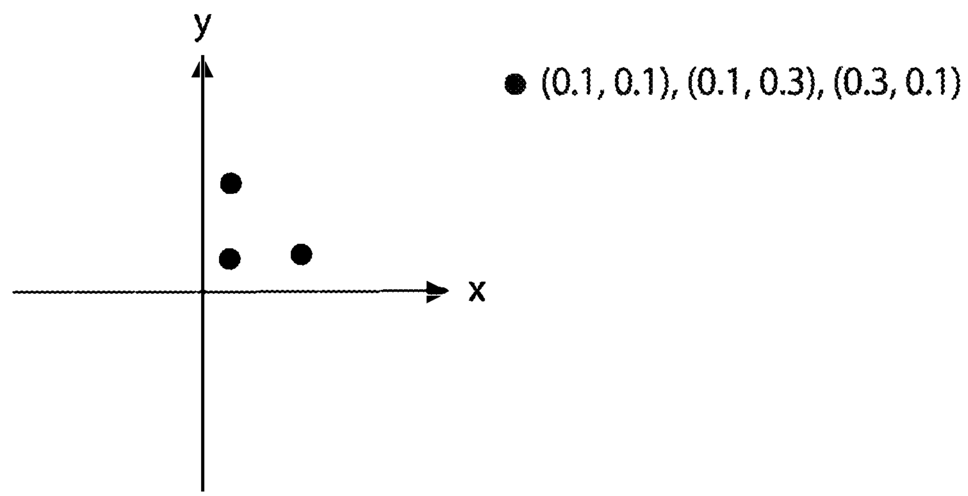

When such a value of the z-axis is not set, the result of persistent homology processing executed on two-dimensional coordinates of three defect chips illustrated in FIG. 6A is the same as the result of persistent homology processing executed on two-dimensional coordinates of three defect chips illustrated in FIG. 6B. This is because the both may be superimposed by parallel translation, and the positional relationship among the three points in FIG. 6A is exactly the same as that in FIG. 6B.

Figure 7:
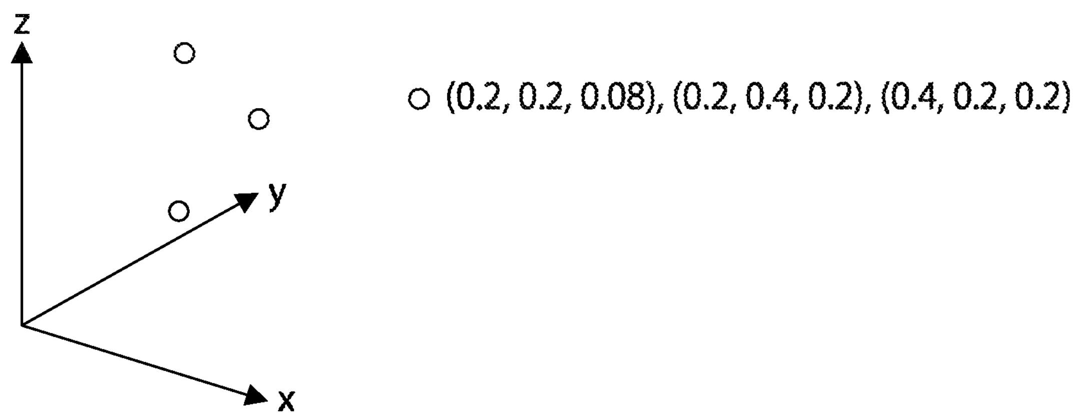
FIGS. 7A and B are diagrams illustrating positions of defect chips on a three-dimensional space.
Figure 7:
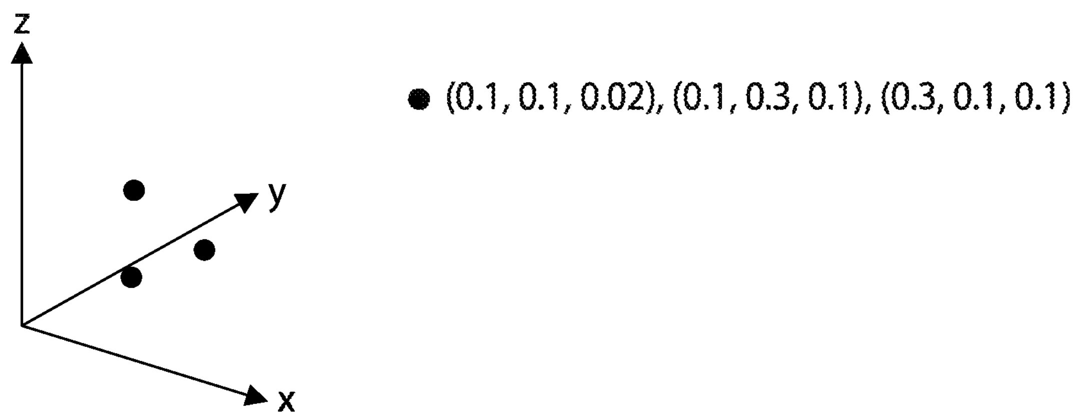

However, when the three-dimensional coordinates are generated with the set value of the z-axis as described above, the positional relationship among the three points is no longer the same as illustrated in FIGS. 7A and 7B. Therefore, the introduction of the three-dimensional coordinates with the distance from the center reflected thereon makes it possible to disable the superimposition of the both by parallel translation.

Figure 8:
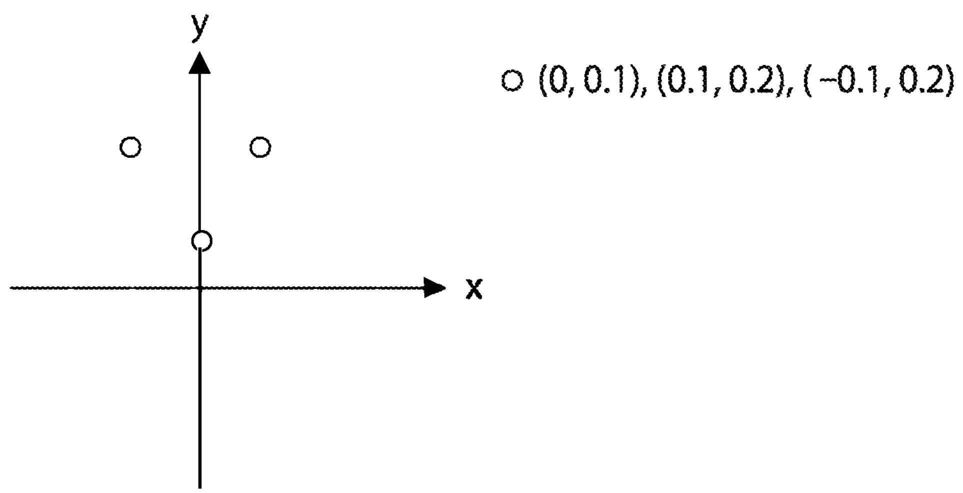
FIGS. 8A and B are diagrams illustrating positions of defect chips on a two-dimensional space.
Figure 8:
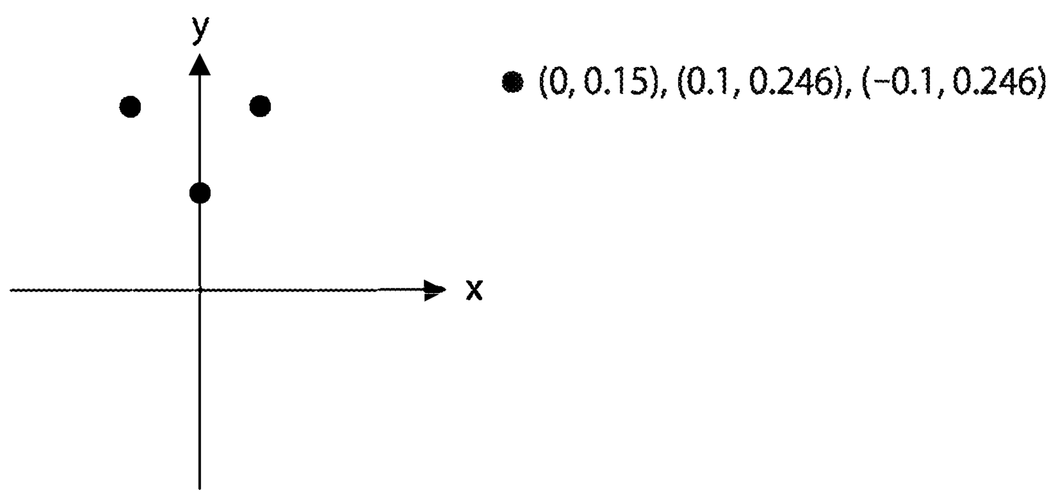
Figure 9:
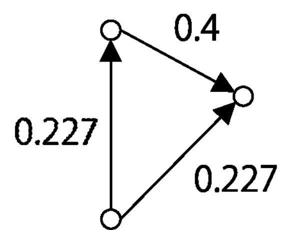
FIGS. 9A and B are diagrams illustrating positions of defect chips on a three-dimensional space.
Figure 9:
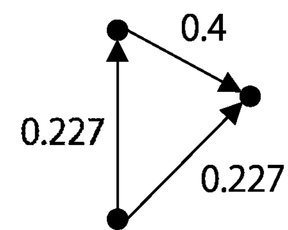

On the other hand, when the value of the z-axis is set in the manner as described above, positional relationships among points become the same in the case of three-dimensional coordinates, even though positional relationships among points are different in the case of two-dimensional coordinates. For example, a positional relationship among three defect chips illustrated in FIG. 8A is different from a positional relationship among three defect chips illustrated in FIG. 8B. However, once the value of the z-axis is set, the distances among the three sides of the triangle are 0.227, 0.227, and 0.4, as illustrated in FIGS. 9A and 9B, meaning that the distance relationship among the points is exactly the same in both cases. That is, with exactly the same positional relationship among the three points, favorable classification may not be performed even with the use of characteristic information extracted by the persistent homology processing.

Therefore, in this embodiment, machine learning and classification are executed using characteristic information extracted in the manner as described below.

Figure 10:
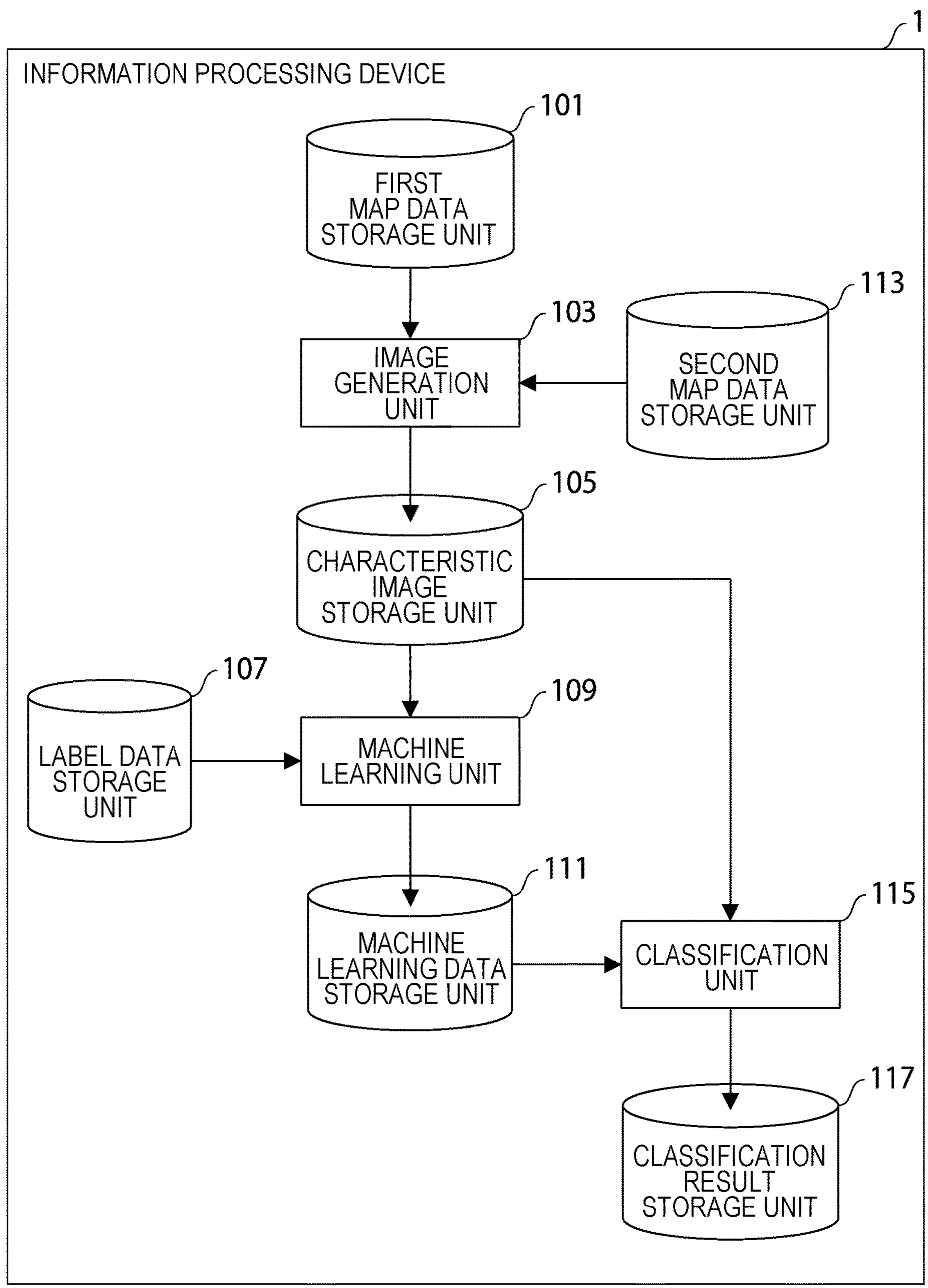
FIG. 10 is a functional block diagram of an information processing device.

FIG. 10 is a functional block diagram of an information processing device 1 according to this embodiment. The information processing device 1 includes a first map data storage unit 101, an image generation unit 103, a characteristic image storage unit 105, a label data storage unit 107, a machine learning unit 109, a machine learning data storage unit 111, a second map data storage unit 113, a classification unit 115, and a classification result storage unit 117.

Figure 30:
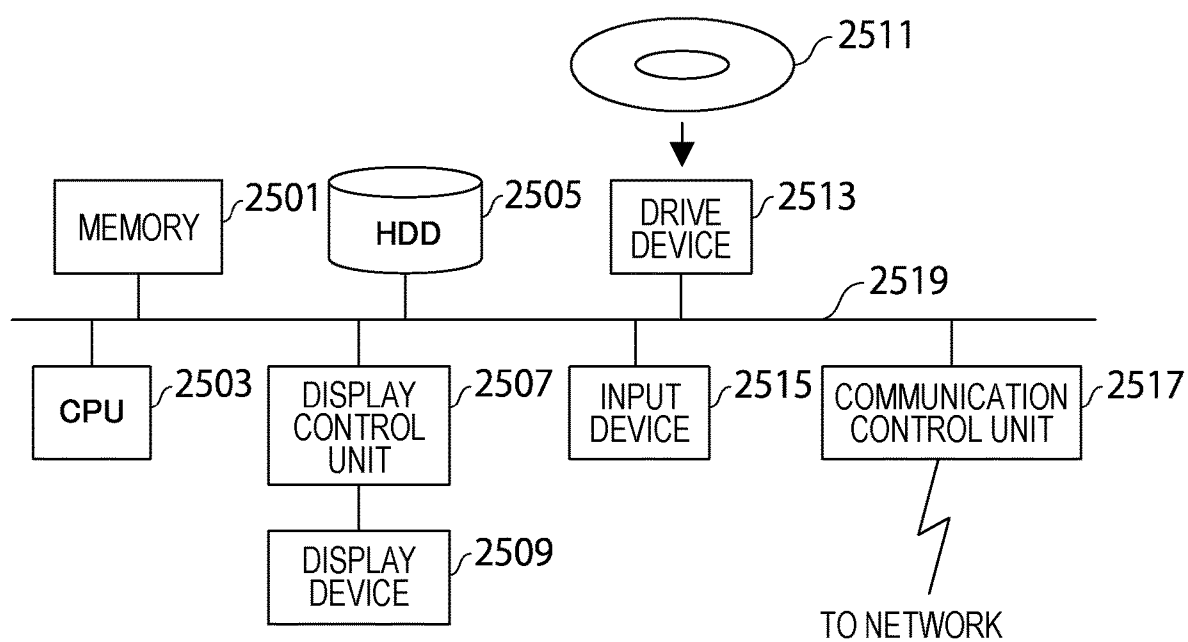
FIG. 30 is a functional block diagram of a computer.

The image generation unit 103, the machine learning unit 109, and the classification unit 115 are realized by a CPU (Central Processing Unit) 2503 illustrated in FIG. 30 executing a program loaded into a memory 2501 illustrated in FIG. 30. The first map data storage unit 101, the characteristic image storage unit 105, the label data storage unit 107, the machine learning data storage unit 111, the second map data storage unit 113, and the classification result storage unit 117 are provided in the memory 2501 or an HDD (Hard Disk Drive) 2505 illustrated in FIG. 30.

The image generation unit 103 executes processing based on data stored in the first map data storage unit 101 and data stored in the second map data storage unit 113, and then stores the processing result in the characteristic image storage unit 105. The machine learning unit 109 executes processing based on data stored in the characteristic image storage unit 105 and data stored in the label data storage unit 107, and then stores the processing result in the machine learning data storage unit 111. The classification unit 115 executes processing based on data stored in the characteristic image storage unit 105 and data stored in the machine learning data storage unit 111, and then stores the processing result in the classification result storage unit 117.

Next, with reference to FIGS. 11 to 29, description is given of processing executed by the information processing device 1.

Figure 11:
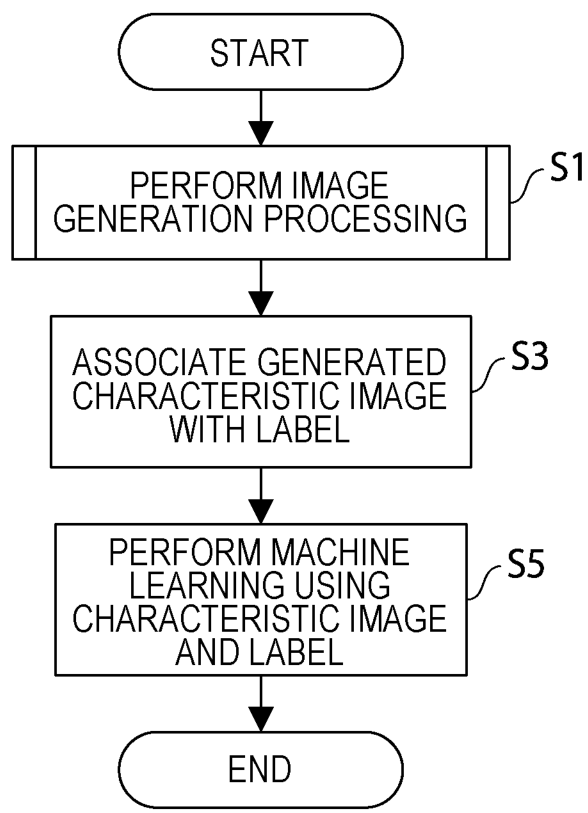
FIG. 11 is a flowchart illustrating a main processing flow.

First, the image generation unit 103 executes image generation processing (FIG. 11: Operation S1). The image generation processing is described with reference to FIGS. 12 to 20.

Figure 12:
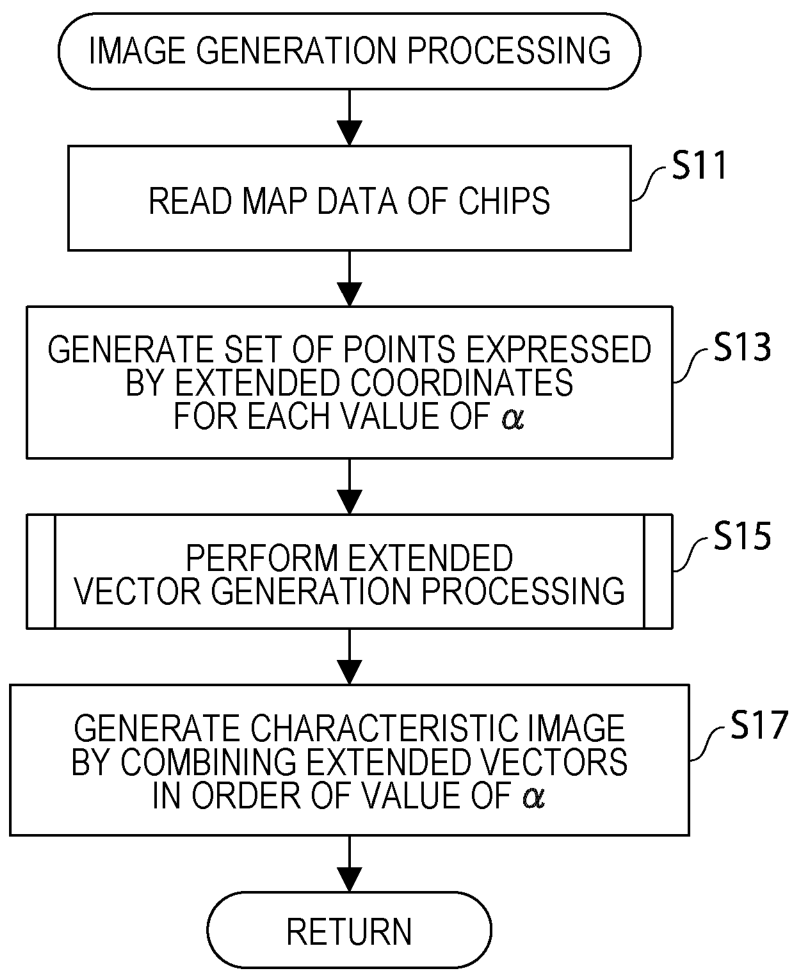
FIG. 12 is a flowchart illustrating a processing flow of image generation processing.
Figure 14:
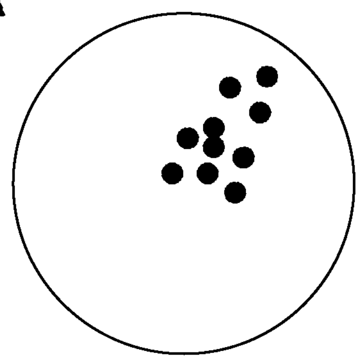
FIGS. 14A and B are diagrams illustrating an example of a distribution of defect chips.
Figure 14:
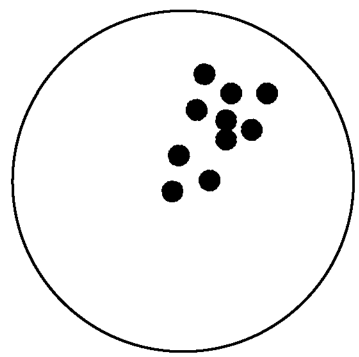

The image generation unit 103 reads map data of defect chips on a wafer from the first map data storage unit 101 (FIG. 12: Operation S11). Note that it is assumed that labels corresponding to the map data stored in the first map data storage unit 101 are already known. The map data includes information capable of identifying two-dimensional coordinates (with the origin being the center of the wafer) of the defect chips.

The image generation unit 103 generates a set of points expressed by extended coordinates from the read map data for each value of a contribution parameter $\alpha$ (Operation S13). The image generation unit 103 stores the set of points generated for each value of the contribution parameter $\alpha$ in the memory 2501.

In Operation S13, extended coordinates are generated for each defect chip. The extended coordinates are three-dimensional coordinates, and the x-coordinate and the y-coordinate are identified from the map data. The z-coordinate is set, for example, by $z=\alpha*(x^2+y^2)$. However, z may be set by another function. To be more specific, such a function may be a monotonically increasing function with the distance from the center of the wafer reflected thereon and with a constant first-order differential, or may be a monotonically increasing function with the distance from the center of the wafer reflected thereon, which is rotated about the z-axis.

The contribution parameter $\alpha$ is, for example, a real number that satisfies $0\leq\alpha\leq1$. However, the range of $\alpha$ is not limited thereto. In this embodiment, a plurality of values set at a regular interval are used, for example, as illustrated in FIG. 13.

The magnitude of change in position of the point when the contribution parameter $\alpha$ is changed represents a distance from the center of the wafer. For example, in a portion close to the center of the wafer, a change in z-coordinate is relatively small even when $\alpha$ is changed, and thus a change in position of the point when $\alpha$ is changed is relatively small. On the other hand, in a portion away from the center of the wafer, a change in z-coordinate is relatively large when $\alpha$ is changed, and thus a change in position of the point when $\alpha$ is changed is relatively large. That is, the distance from the center of the wafer may be estimated from the magnitude of change in position of the point when $\alpha$ is changed.

The magnitude of change in position of the point when the contribution parameter $\alpha$ is changed represents the direction from the center of the wafer. For example, as illustrated in FIG. 14A, when the density of defect chips at the center of the wafer is larger than the density of defect chips at the edge of the wafer, a change in position of the point when $\alpha$ is changed is relatively small. On the other hand, as illustrated in FIG. 14B, when the density of defect chips at the center of the wafer is smaller than the density of defect chips at the edge of the wafer, a change in position of the point when $\alpha$ is changed is relatively large. Therefore, the direction from the center of the wafer may be estimated from the magnitude of change in position of the point when $\alpha$ is changed.

Accordingly, the introduction of extended coordinates as in this embodiment enables generation of characteristic information with the positional relationship between defect chips, the distance from the center of the wafer, and the direction from the center of the wafer reflected thereon. As is clear from the above description, even the "proximity" may be estimated from the characteristic information.

Then, the image generation unit 103 performs extended vector generation processing using the set of points stored in the memory 2501 (Operation S15). The extended vector generation processing is described with reference to FIGS. 15 to 20.

Figure 15:
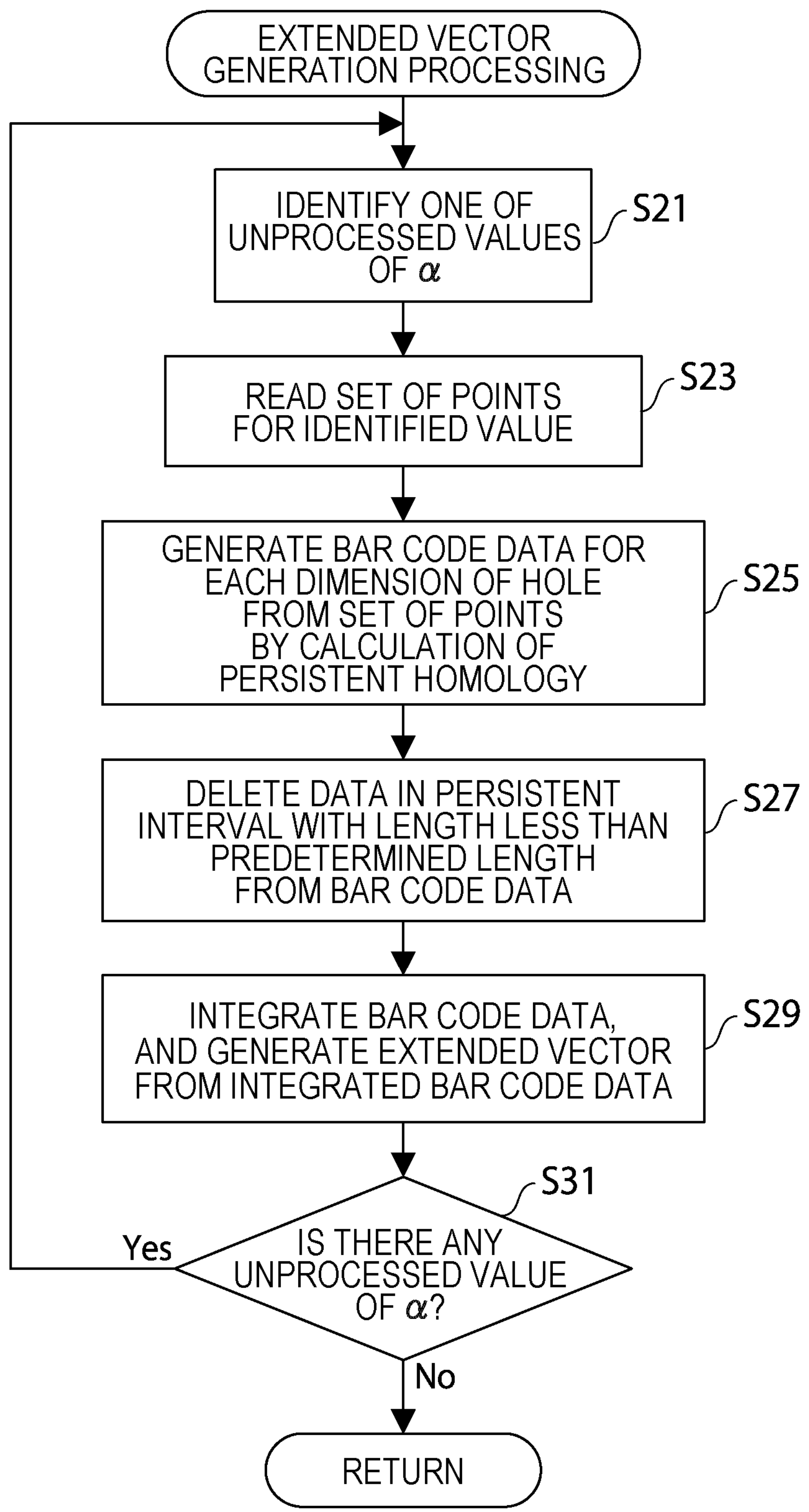
FIG. 15 is a flowchart illustrating a processing flow of extended vector generation processing.

First, the image generation unit 103 identifies one of unprocessed values of the contribution parameter $\alpha$ (FIG. 15: Operation S21).

Then, the image generation unit 103 reads a set of points for the value identified in Operation S21 from the memory 2501 (Operation S23).

The image generation unit 103 generates bar code data for each dimension of a hole (hereinafter referred to as the hole dimension) from the set of points by persistent homology processing (Operation S25).

"Homology" is a technique of expressing a target characteristic by the number of m ($m\geq0$)-dimensional holes. The "hole" mentioned here is the source of a homology group. A zero-dimensional hole is a connected component, a one-dimensional hole is a hole (tunnel), and a two-dimensional hole is a hollow. The number of holes in each dimension is called a Betti number.

"Persistent homology" is a technique for characterizing a transition of m-dimensional holes in a target (here, a set of points). The persistent homology enables checking of characteristics regarding the location of points. In this technique, each of the points in the target is gradually spherically expanded, and the time of generation (represented by the radius of the sphere at the time of occurrence) of each hole during the process and the time of annihilation (represented by the radius of the sphere at the time of annihilation) thereof are identified.

Figure 16:
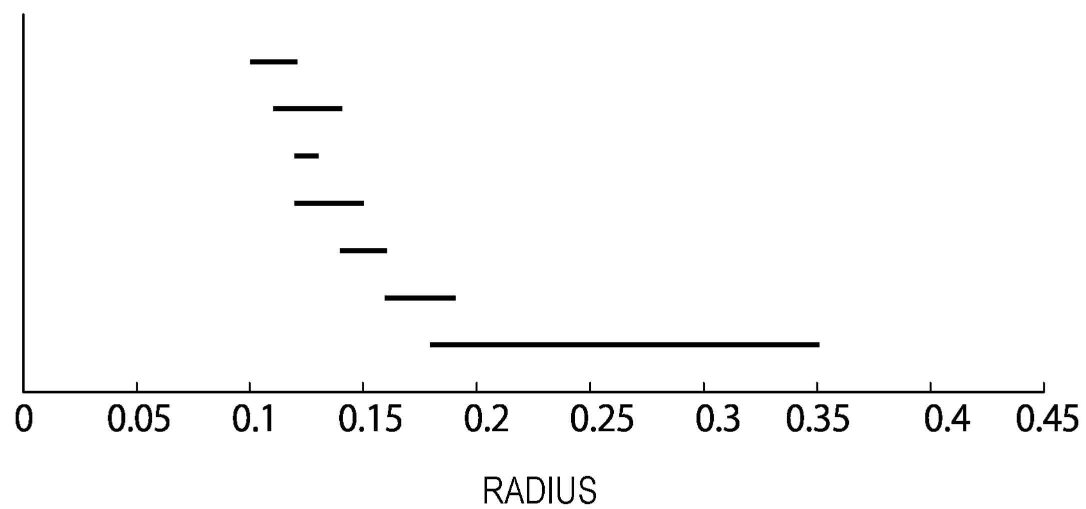
FIG. 16 is a diagram illustrating an example of a bar code chart.

The use of the occurrence radius and the annihilation radius of the hole enables generation of a bar code chart, for example, as illustrated in FIG. 16. In FIG. 16, the horizontal axis represents the radius, and each line segment corresponds to one hole. The radius corresponding to the left end of the line segment is the occurrence radius of the hole, while the radius corresponding to the right end of the line segment is the annihilation radius of the hole. The line segment is called a persistent interval. It may be seen from such a bar code chart, for example, that there are two holes when the radius is 0.18.

FIG. 17 illustrates an example of data for generating a bar code chart (hereinafter referred to as the bar code data). In the example of FIG. 17, the bar code data includes a value representing the hole dimension, the occurrence radius of the hole, and the annihilation radius of the hole. In Operation S25, the bar code data is generated for each hole dimension.

By executing the above processing, an analogous relationship between bar code data generated from a certain set of points and bar code data generated from another set of points is equivalent to an analogous relationship between the sets of points. Therefore, the relationship between the set of points and the bar code data is a one-to-one relationship.

More specifically, the same set of points leads to the same bar code data to be generated. Conversely, the same bar code data leads to the same set of points. Since an analogous set of points also leads to analogous bar code data, requirements for machine learning are satisfied. On the other hand, a different set of points leads to different bar code data.

See, for example, "Protein Structure and Topology: Introduction to Persistent Homology" by Yasuaki Hiraoka, Kyoritsu Shuppan, for further details of persistent homology.

Referring back to FIG. 15, the image generation unit 103 deletes data in a persistent interval with a length less than a predetermined length from the bar code data generated in Operation S25 (S27). Note that the length of the persistent interval is calculated by (annihilation radius-occurrence radius). The predetermined length is a length of time (hereinafter referred to as the block), for example, obtained by dividing the time between the occurrence of a zero-dimensional hole and the annihilation thereof by K. However, the predetermined length is not limited to the length of one block, but may be the length of more than one block.

Most of the source with the short time between the occurrence and the annihilation is caused by noise. The influence of noise may be reduced by deleting data in the persistent interval with the length less than the predetermined length. Thus, classification performance may be improved. However, the target to be deleted is data in a persistent interval of one or more dimensions.

When noise is generated, holes of one or more dimensions may be generated for a short amount of time. By executing the processing of Operation S27, approximately the same data is generated in both cases. Thus, the influence of such noise may be reduced.

Note that, since the data in the persistent interval with the length less than the predetermined length is deleted, the analogous relationship between the bar code data after the deletion is not strictly equivalent to the analogous relationship between the original bar code data. The analogous relationship is equivalent if no data is deleted.

Referring back to FIG. 15, the image generation unit 103 integrates the bar code data to generate an extended vector (which is the Betti number group) from the integrated bar code data (Operation S29).

Figure 18:
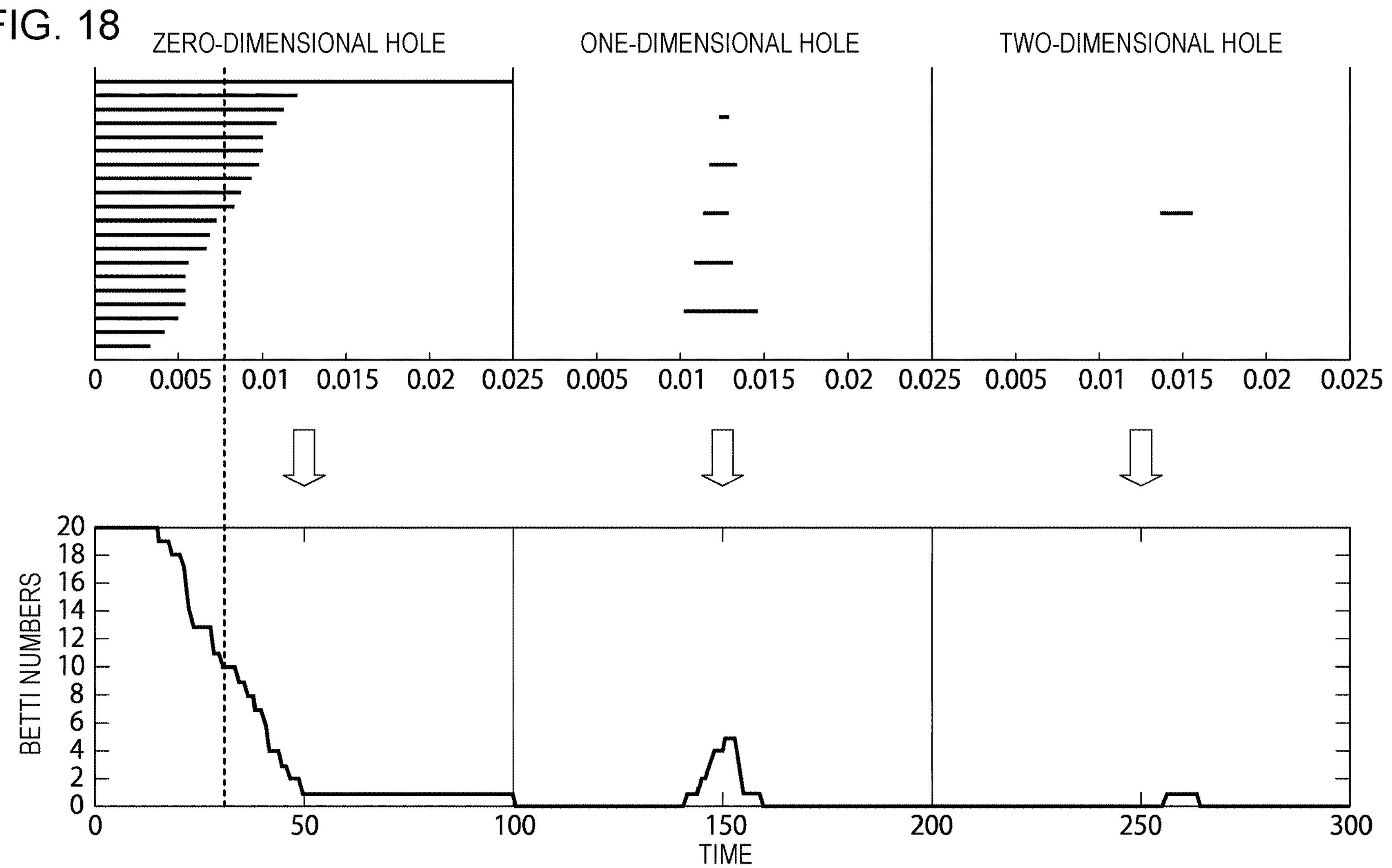
FIG. 18 is a diagram for explaining a relationship between the bar code data and the Betti group.

As described above, the bar code data is generated for each hole dimension. Thus, the image generation unit 103 generates a cluster of bar code data by integrating bar code data of more than one hole dimension. The Betti number group is data representing a relationship between the radius of the sphere (that is, time) and the Betti number in the persistent homology. With reference to FIG. 18, description is given of a relationship between bar code data and the Betti number to be generated. The upper graph is generated from the bar code data, in which the horizontal axis represents the radius. The lower graph is generated from the Betti number group, in which the vertical axis represents the Betti number and the horizontal axis represents time. As described above, the Betti number represents the number of holes. For example, since the number of holes present is 10 at the time of the radius corresponding to the dashed line in the upper graph, the Betti number corresponding to the dashed line is also 10 in the lower graph. The Betti number is counted for each block. Since the lower graph is a graph of dummy time series data, the value itself in the horizontal axis does not have any meaning.

Basically, the same group is obtained by the same bar code data. That is, the same group is obtained if the original set of points is the same. However, there is a very rare case where the same group is obtained from different bar codes.

Figure 19:
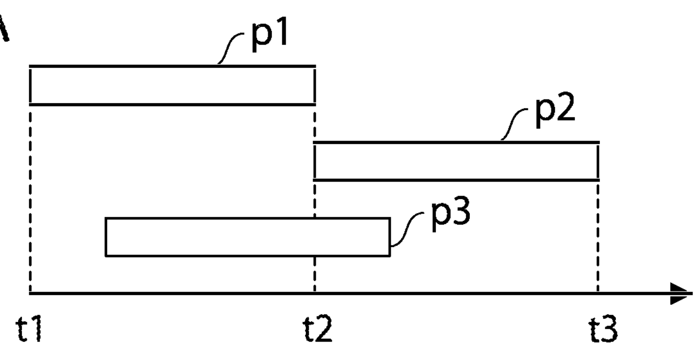
FIGS. 19A and B are diagrams illustrating an example of a persistent interval.
Figure 19:
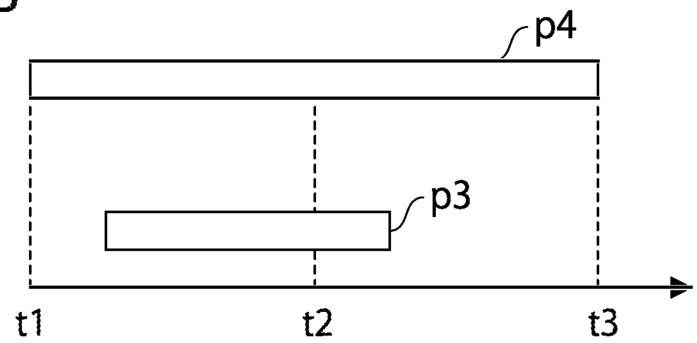

For example, bar code data as illustrated in FIG. 19 is considered. Assuming that this bar code data is data on holes of one or more dimensions, in the case of FIG. 19A, a persistent interval p1 starts at a time t1 and ends at a time t2, and a persistent interval p2 starts at a time t2 and ends at a time t3. On the other hand, in the case of FIG. 19B, a persistent interval p4 starts at the time t1 and ends at the time t3. A persistent interval p3 is exactly the same in the both cases.

In such a case, exactly the same group is obtained from the bar code data in the both cases, and thus the both cases may not be differentiated from each other. However, such a phenomenon is very unlikely to occur. Moreover, the sets of points in the both cases are originally similar and have a very small impact on classification by machine learning. Therefore, the occurrence of such a phenomenon does not cause any problem.

Therefore, the analogous relationship between the Betti number group generated from certain bar code data and the Betti number group generated from another bar code data is equivalent to the analogous relationship between the bar code data unless such a rare case as described above occurs. For this reason, the analogous relationship between the Betti number group generated from the bar code data is approximately equivalent to the analogous relationship between the original sets of points.

Referring back to FIG. 15, the image generation unit 103 determines whether or not there is any unprocessed value of α (Operation S31). When there is any unprocessed value (Operation S31: Yes route), the processing returns to Operation S21. When there is no unprocessed value (Operation S31: No route), the processing returns to the caller.

By executing the persistent homology processing as described above, the distribution of defect chips represented by the set of points expressed by extended coordinates may be reflected on the bar code data. Thus, classification corresponding to the distribution of defect chips may be performed by machine learning.

Since the number of bar codes is not fixed in the bar code data generated by the persistent homology processing, it is difficult to use the bar code data directly as inputs of machine learning. Therefore, in this embodiment, transforming the bar code data to the Betti number group enables the bar code data to be used as inputs of machine learning.

As described above, according to this embodiment, the influence of noise may be reduced.

Referring back to FIG. 12, the image generation unit 103 generates a characteristic image by combining the extended vectors generated in Operation S15 in order of the value of α (Operation S17) and stores the generated characteristic image in the characteristic image storage unit 105. Then, the processing returns to the caller.

Figure 20:
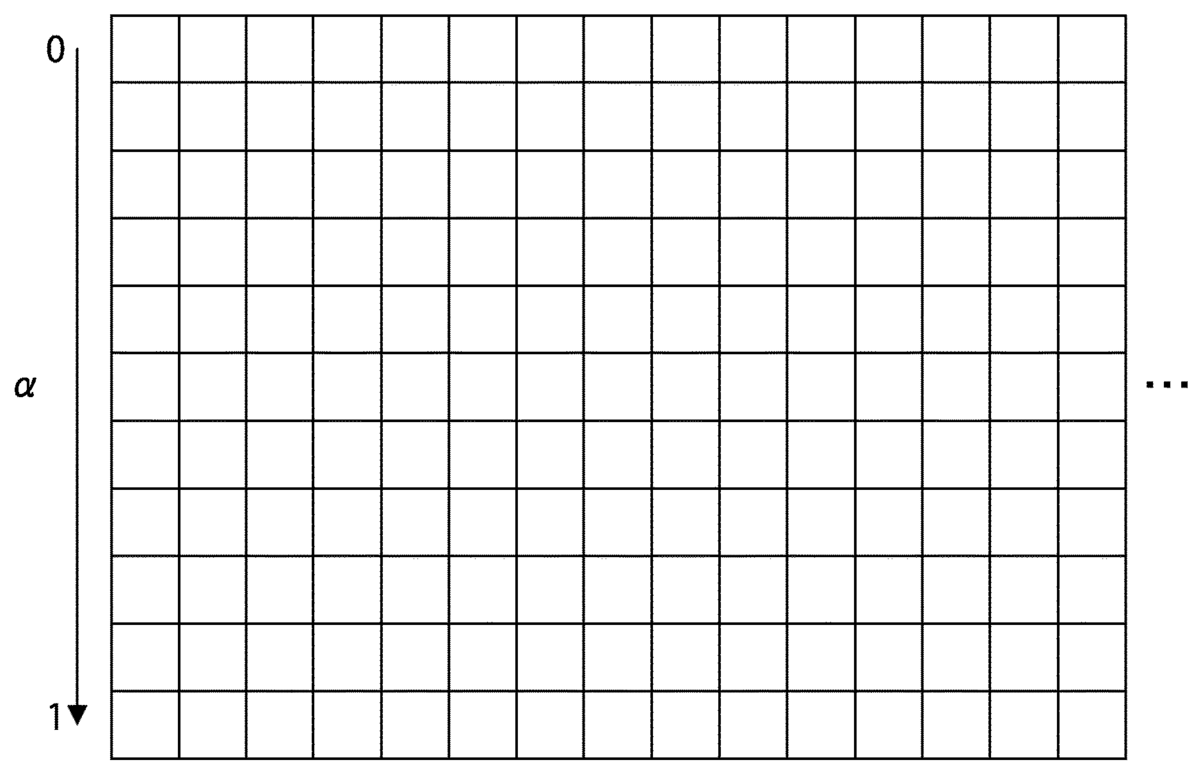
FIG. 20 is a diagram for explaining a characteristic image.

FIG. 20 is a diagram illustrating an example of a characteristic image. The squares represent cells, and the Betti number that is an element of the extended vector is stored in each of the cells. One row corresponds to one extended vector. Therefore, in the example of FIG. 20, eleven extended vectors are combined, and the characteristic image corresponds to a matrix with eleven rows. Although the number of elements in the extended vector is 15 in FIG. 20, the number of elements is not limited thereto.

Referring back to FIG. 11, the machine learning unit 109 reads a label corresponding to the characteristic image stored in the characteristic image storage unit 105 from the label data storage unit 107. Note that, since labels corresponding to map data to be stored in the first map data storage unit 101 are already known, the label corresponding to the characteristic image stored in the characteristic image storage unit 105 may be identified. The label is, for example, information of a distribution pattern name of defect chips. Then, the machine learning unit 109 associates the characteristic image stored in the characteristic image storage unit 105 with the read label (Operation S3).

The machine learning unit 109 executes machine learning using the characteristic image stored in the characteristic image storage unit 105 and the label associated with the characteristic image (Operation S5). For example, machine learning using a neural network is executed. The machine learning unit 109 stores machine learning data (for example, updated weighting matrix and the like) in the machine learning data storage unit 111. Then, the processing is terminated.

The machine learning executed as described above based on the characteristic image on which the characteristic of the distribution of defects on the wafer is properly reflected makes it possible to improve the accuracy of classification to be executed later.

Next, with reference to FIG. 21, description is given of processing of classifying map data using the result of the processing described with reference to FIGS. 11 to 20.

Figure 21:
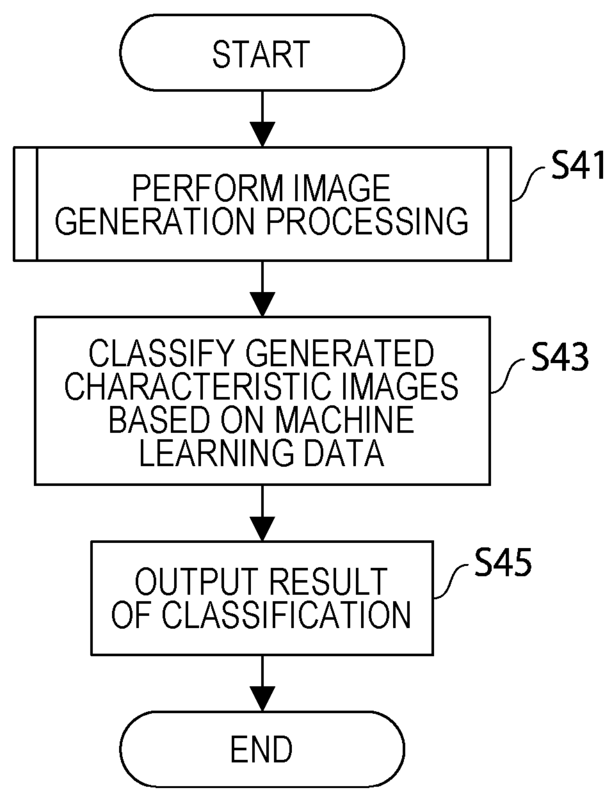
FIG. 21 is a flowchart illustrating a processing flow of map data classification processing.

First, the image generation unit 103 executes image generation processing (FIG. 21: Operation S41). The image generation processing is as described with reference to FIGS. 12 to 20, and thus description thereof is omitted. Note, however, that map data stored in the second map data storage unit 113 is processed in the image generation processing in Operation S41. It is assumed that labels corresponding to the map data stored in the second map data storage unit 113 are unknown. For example, newly generated map data is stored in the second map data storage unit 113 to identify a problem of a manufacturing device in operation.

The classification unit 115 classifies the characteristic image generated in Operation S41 based on the machine learning data stored in the machine learning data storage unit 111 (Operation S43). For example, classification using a neural network is performed.

The classification unit 115 stores the result of the classification executed in Operation S43 in the classification result storage unit 117 (Operation S45). For example, the label of the class to which the characteristic image generated in Operation S41 is stored in the classification result storage unit 117 in association with the characteristic image. Then, the processing is terminated.

By executing the processing as described above, any problematic step may be identified among the steps of manufacturing an IC chip.

Advantageous effects of the method according to this embodiment are described below based on comparison with another method.

Figure 22:
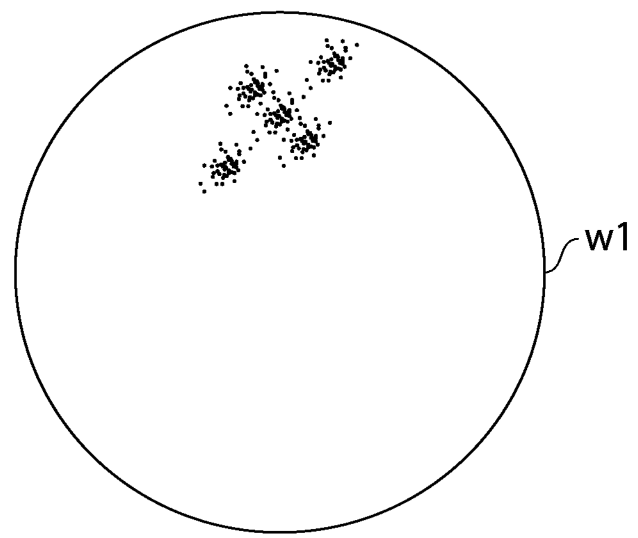
FIG. 22 is a diagram illustrating an example of a distribution of defect chips.
Figure 23:
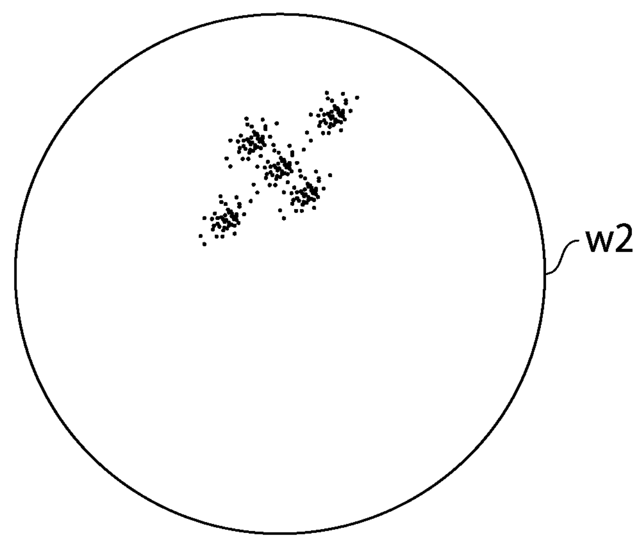
FIG. 23 is a diagram illustrating an example of a distribution of defect chips.
Figure 24:
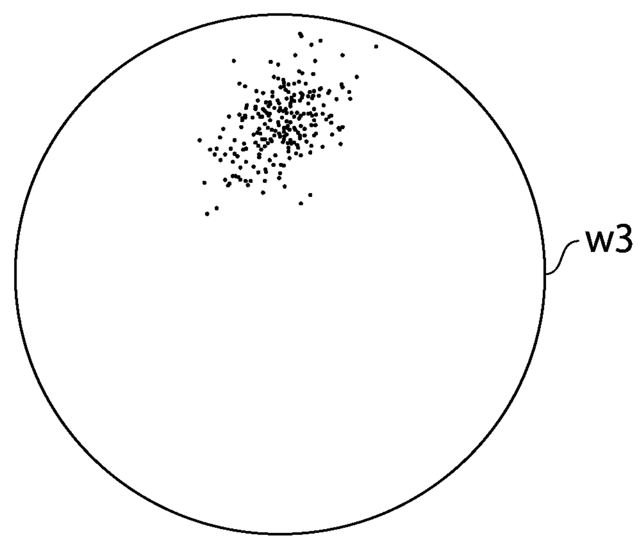
FIG. 24 is a diagram illustrating an example of a distribution of defect chips.

Here, three wafers illustrated in FIGS. 22 to 24 are used as targets. It is assumed that a wafer w1 of FIG. 22 and a wafer w2 of FIG. 23 are similar in shape of distribution but different in distribution position, and thus are to be classified into different classes. It is also assumed that the wafer w1 of FIG. 22 and a wafer w3 of FIG. 24 are approximately the same in distribution position of defect chips but different in cause of defects, and thus are to be classified into different classes.

Figure 25:
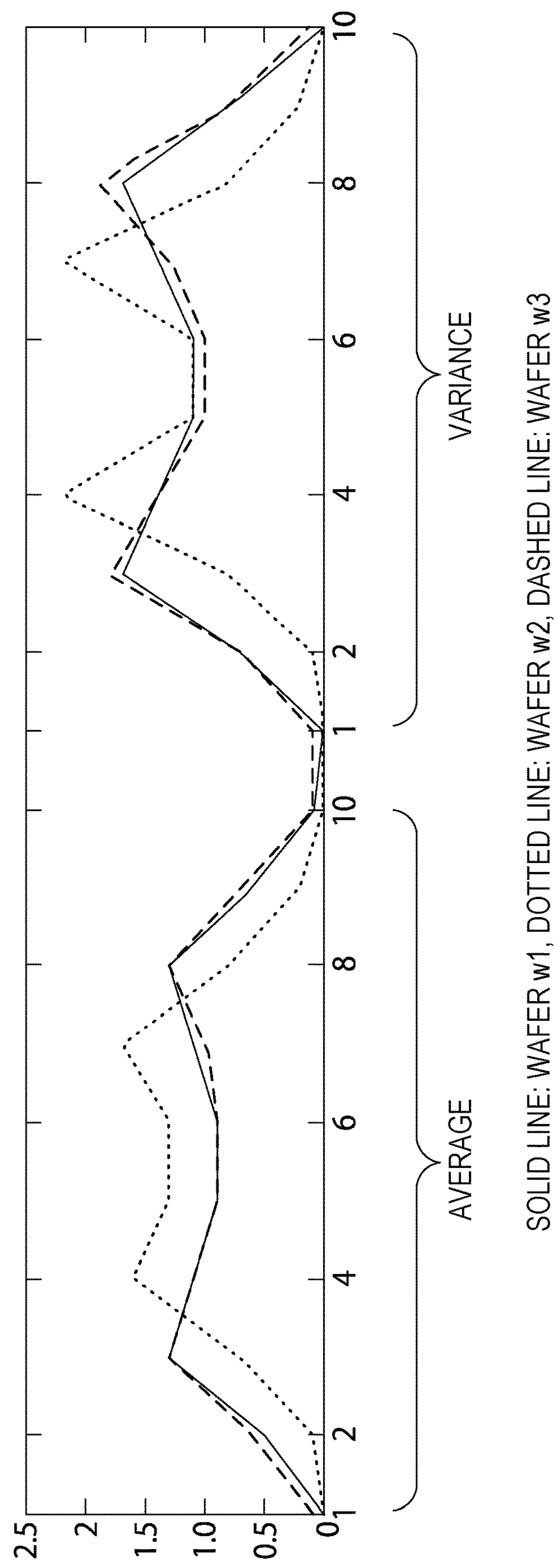
FIG. 25 is a diagram illustrating a characteristic amount extracted based on Radon transform.

FIG. 25 is a diagram illustrating a characteristic amount extracted based on Radon transform. The left half of the graph illustrated in FIG. 25 is a graph for the average, while the right half of the graph illustrated in FIG. 25 is a graph for the variance. The horizontal axis represents the number of divisions, and the vertical axis represents values of the average and the variance. In the graph illustrated in FIG. 25, the solid line and the dotted line are different in shape but roughly overlap with each other. Therefore, when classification is executed based on the characteristic amount illustrated in FIG. 25, the wafer w1 and the wafer w3 may be classified into the same class.

Figure 26:
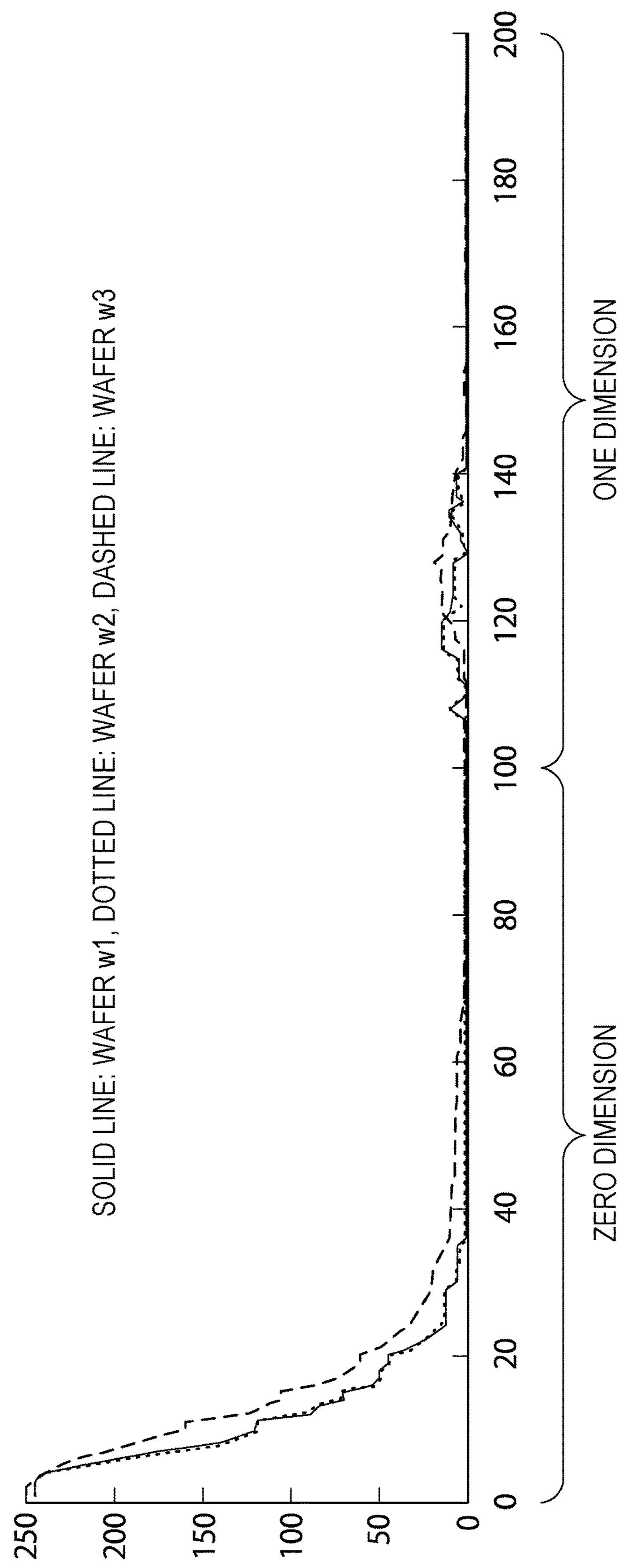
FIG. 26 is a diagram illustrating a characteristic amount extracted by a method using persistent homology.

FIG. 26 is a diagram illustrating a characteristic amount (that is, the Betti number group) extracted by the method using persistent homology described with reference to FIGS. 6 to 9. The left half of the graph illustrated in FIG. 26 is a graph of Betti numbers for the zero dimension, while the right half of the graph illustrated in FIG. 26 is a graph of Betti numbers for the one dimension. The horizontal axis represents the radius, and the vertical axis represents the Betti number. In the graph illustrated in FIG. 26, the solid line and the dashed line are different in shape, but the solid line and the dotted line roughly overlap with each other. Therefore, when classification is executed based on the characteristic amount illustrated in FIG. 26, the wafer w1 and the wafer w2 may be classified into the same class.

Figure 27:
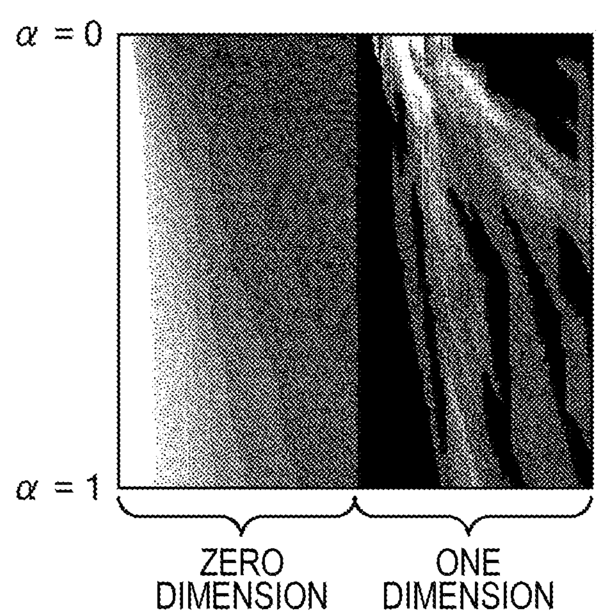
FIG. 27 is a diagram illustrating an example of a characteristic image.
Figure 28:
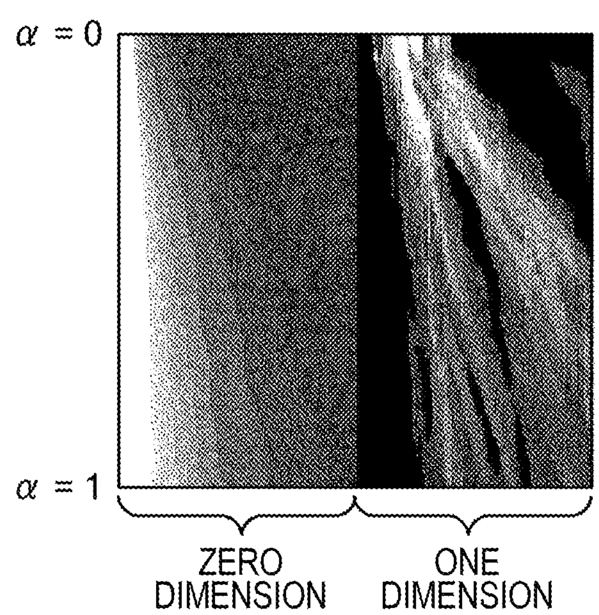
FIG. 28 is a diagram illustrating an example of a characteristic image.
Figure 29:
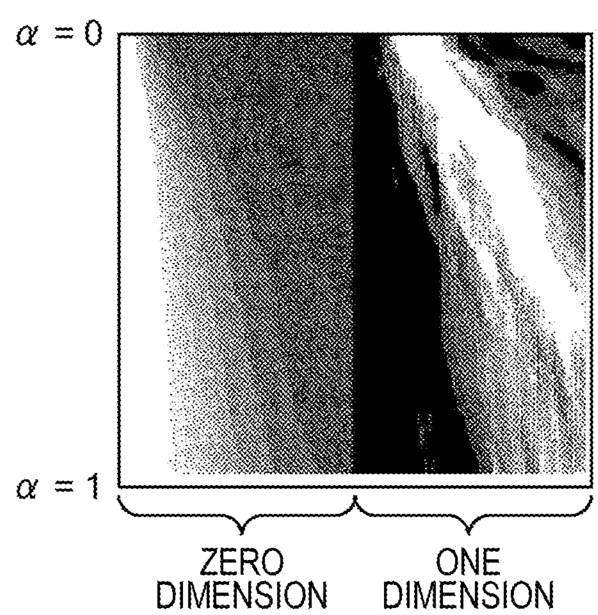
FIG. 29 is a diagram illustrating an example of a characteristic image.

FIGS. 27 to 29 are diagrams illustrating characteristic images generated by the method according to this embodiment. FIG. 27 is a diagram illustrating a characteristic image of the wafer w1, FIG. 28 is a diagram illustrating a characteristic image of the wafer w2, and FIG. 29 is a diagram illustrating a characteristic image of the wafer w3. When the characteristic images of the wafers w1 and w2 are compared, the both are different in density of a white region. When the characteristic images of the wafers w1 and w3 are compared, the both are different in shape of the white region. Therefore, when classification is executed based on the characteristic images generated by the method according to this embodiment, the wafers w1, w2, and w3 may be classified into different classes.

Although an embodiment of the present invention has been described above, the present invention is not limited thereto. For example, the functional block configuration of the information processing device 1 described above may not correspond to an actual program module configuration.

Moreover, the data configuration described above is just an example, and the present invention is not limited thereto. Furthermore, as for the processing flow, the processing order may be changed as long as the processing result is not changed. Furthermore, the processing may be executed in parallel.

Note that a random defect different from a systematic defect attributable to a cause unique to the IC chip manufacturing process is present in each distribution pattern. The target defect in this embodiment is the systematic defect.

Note that the information processing device 1 described above is a computer device, as illustrated in FIG. 30, in which the memory 2501, the CPU 2503, the HDD 2505, a display control unit 2507 connected to a display device 2509, a drive device 2513 for a removable disk 2511, an input device 2515, and a communication control unit 2517 for connecting to a network are connected through a bus 2519. An operating system (OS: Operating system) and application programs to perform the processing in this embodiment are stored in the HDD 2505 and read from the HDD 2505 into the memory 2501 when executed by the CPU 2503. The CPU 2503 controls the display control unit 2507, the communication control unit 2517, and the drive device 2513, according to processing contents of the application programs, to perform predetermined operations. Moreover, data that is being processed is basically stored in the memory 2501, but may be stored in the HDD 2505. In the embodiment of the present invention, the application program for performing the processing described above is distributed while being stored in the computer-readable removable disk 2511 and installed into the HDD 2505 from the drive device 2513 or may be installed into the HDD 2505 through a network such as the Internet and the communication control unit 2517. Such a computer device realizes various functions as described above through organic cooperation between hardware such as the CPU 2503 and the memory 2501 described above and the OS and programs such as application programs.

The above embodiment of the present invention is summarized as follows.

A data generation method according to a first aspect of this embodiment includes the processing of (A) generating, for each of a plurality of wafers, extended coordinates including a position (for example, x-coordinate and y-coordinate) on the wafer and a value calculated from a distance from the center of the wafer and a contribution parameter, for each defect on the wafer by using information (for example, map data) of a defect position on the wafer; (B) generating a Betti number group (for example, extended vector) by persistent homology for the plurality of extended coordinates generated for each of the plurality of wafers; (C) generating, for each of the plurality of wafers, a defect pattern image (for example, characteristic image) from the plurality of Betti number groups generated for the plurality of values of contribution parameter; and (D) generating machine learning data associating the plurality of defect pattern images generated for the plurality of wafers with determination information associated with the plurality of wafers.

The information of defect positions on the wafer is transformed to a defect pattern image suitable for classification.

Moreover, the processing of generating a defect pattern image may include (c1) generating the defect pattern image by combining a plurality of Betti number groups in order of the value of the contribution parameter.

Thus, a defect pattern image may be generated, on which the distance from the center of the wafer and the direction from the center of the wafer are reflected.

Moreover, the processing of generating a Betti number group may include (b1) generating the Betti number group by connecting time series data of the Betti numbers of each dimension generated by persistent homology for the generated plurality of extended coordinates.

Thus, the information of positional relationships between the plurality of extended coordinates is properly reflected on the Betti number groups.

Moreover, the value representing the position on the wafer includes a value of a first axis and a value of a second axis orthogonal to the first axis, and a value calculated from the distance from the center and the value of the contribution parameter may be a value obtained by multiplying a value representing the distance from the center by the value of the contribution parameter, and may also be a value on a third axis orthogonal to the first and second axes.

Moreover, the determination information may be a label.

A data generation device according to a second aspect of this embodiment includes: (E) a first generation unit (the image generation unit 103 in the embodiment is an example of the first generation unit) configured to generate, for each of a plurality of wafers, extended coordinates including a position on the wafer and a value calculated from a distance from the center of the wafer and a contribution parameter, for each defect on the wafer by using information of a defect position on the wafer, to generate a Betti number group by persistent homology for the plurality of extended coordinates generated for each of the plurality of wafers, and to generate, for each of the plurality of wafers, a defect pattern image from the plurality of Betti number groups generated for the plurality of values of contribution parameter; and (F) a second generation unit (the machine learning unit 109 in the embodiment is an example of the second generation unit) configured to generate machine learning data associating the plurality of defect pattern images generated for the plurality of wafers with determination information associated with the plurality of wafers.

Note that a program for causing a processor to perform the processing by the above method may be created. This program is stored, for example, in a computer-readable storage medium such as a flexible disk, a CD-ROM, a magneto optical disk, a semiconductor memory, and a hard disk, or in a storage device. Note that intermediate processing results are temporarily stored in a storage device such as a main memory.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable recording medium storing a program that causes a computer to execute a procedure, the procedure comprising:

generating, for each of a plurality of wafers, extended coordinates including a position over the wafer and a value calculated from a distance from a center of the wafer and a contribution parameter, for each defect of the wafer by using information of a defect position over the wafer;

generating a Betti number group by persistent homology processing for a plurality of extended coordinates generated for each of the plurality of wafers;

generating, for each of the plurality of wafers, a defect pattern image from a plurality of Betti number groups generated for the plurality of values of contribution parameter; and generating machine learning data associating a plurality of defect pattern images generated for the plurality of wafers with determination information associated with the plurality of wafers.

2. The non-transitory computer-readable recording medium according to claim 1, wherein the procedure generates the defect pattern image by combining the plurality of Betti number groups in order of the value of the contribution parameter.

3. The non-transitory computer-readable recording medium according to claim 1, wherein the procedure generates the Betti number group by coupling time series data of the Betti number of each dimension generated by persistent homology processing for the generated plurality of extended coordinates.

4. The non-transitory computer-readable recording medium according to claim 1, wherein the value representing the position over the wafer includes a value of a first axis and a value of a second axis orthogonal to the first axis, and wherein a value calculated from the distance from the center and the value of the contribution parameter is a value obtained by multiplying a value representing the distance from the center by the value of the contribution parameter, and is also a value of a third axis orthogonal to the first and second axes.

5. The non-transitory computer-readable recording medium according to claim 1, wherein the determination information is a label.

6. A data generation method comprising:

generating, for each of a plurality of wafers, extended coordinates including a position over the wafer and a value calculated from a distance from a center of the wafer and a contribution parameter, for each defect of the wafer by using information of a defect position over the wafer;

generating a Betti number group by persistent homology processing for a plurality of extended coordinates generated for each of the plurality of wafers;

generating, for each of the plurality of wafers, a defect pattern image from a plurality of Betti number groups generated for the plurality of values of contribution parameter; and generating machine learning data associating a plurality of defect pattern images generated for the plurality of wafers with determination information associated with the plurality of wafers, by a processor.

7. A data generation device comprising:

a memory; and a processor coupled to the memory and the processor configured to:

generate, for each of a plurality of wafers, extended coordinates including a position over the wafer and a value calculated from a distance from a center of the wafer and a contribution parameter, for each defect of the wafer by using information of a defect position over the wafer;

generate a Betti number group by persistent homology processing for a plurality of extended coordinates generated for each of the plurality of wafers;

generate, for each of the plurality of wafers, a defect pattern image from a plurality of Betti number groups generated for the plurality of values of contribution parameter; and generate machine learning data associating a plurality of defect pattern images generated for the plurality of wafers with determination information associated with the plurality of wafers.

* * * * *